May 23, 1961 H. J. A. VON BECKH WIDMANSTETTER 2,985,413

MULTI-DIRECTIONAL ANTI-G DEVICE

Filed July 8, 1958 3 Sheets-Sheet 1

INVENTOR

Haraldo Juan Albrecht Von Beckh Widmanstetter

BY

Munn, Liddy, Daniels & Marsh

ATTORNEY

May 23, 1961 H. J. A. VON BECKH WIDMANSTETTER 2,985,413

MULTI-DIRECTIONAL ANTI-G DEVICE

Filed July 8, 1958 3 Sheets-Sheet 2

INVENTOR

Haraldo Juan Albrecht Von Beckh Widmanstetter

BY

Munn, Liddy, Daniels & Marsh

ATTORNEY

May 23, 1961 H. J. A. VON BECKH WIDMANSTETTER 2,985,413

MULTI-DIRECTIONAL ANTI-G DEVICE

Filed July 8, 1958 3 Sheets-Sheet 3

INVENTOR

Haraldo Juan Albrecht Von Beckh Widmanstetter

BY

ATTORNEY

United States Patent Office 2,985,413
Patented May 23, 1961

2,985,413

MULTI-DIRECTIONAL ANTI-G DEVICE

Haraldo Juan Albrecht von Beckh Widmanstetter,
1500 Cuba Ave., Alamogordo, N. Mex.

Filed July 8, 1958, Ser. No. 747,208
6 Claims. (Cl. 244—140)

As threshold of a manned space flight approaches man has developed vehicles capable of circling the earth and achieving considerable velocities compared with the heretofore known airplanes and similar craft. Furthermore airplanes as we know them today are now capable of very rapid changes in velocity (either speed or direction). The increasing accelerations which result in the changes available with such craft result in increasing stresses on the living creatures within the vehicles. The excessive velocities involved compared to those heretofore known subject living organisms such as human beings, or test-animals, to forces which if the subjects are not properly supported can even result in destruction. At least these forces will injure the subject. This is undesirable from the personal view of the subject as well as because of the undesirable factors which may be introduced into experimental work as a result of injuries. Further in manned craft such as military craft changes in direction at the speeds now possible results in conditions, even though they are not permanently harmful, under which the operator is at least temporarily unable to control his craft. These conditions are usually referred to as blackouts. These and other factors and particularly those involved in the contemplated space flights have made it imperative to devise some method for supporting life in vehicles which will enable the manned vehicles, where human pilots are involved, to be properly controlled, to prevent injury to the operators, and other personnel, and in the case of vehicles manned solely by test animals to support their life during the accelerations that are involved. Accordingly an object of this invention is to provide a method and means for supporting life in vehicles subject to rapid velocity changes which will both adequately protect the subject and in case of manned craft insure more continuous control of the craft by the operator.

The forces which are applied during a change in direction, for example, or an acceleration other than that occurring in a change in direction, are equated, in the art, to the force of gravity. These forces being designated as so many G's.

It is known that the tolerance of man and animals to G loads is much greater when these act in a direction transverse to the spinal axis of the subject. Accordingly one object of this invention is to provide a means for continuously supporting and orienting the subjects in vehicles in such a direction that their spinal axis will be transverse the resultant of the G load during all movements of the craft.

All craft have a longitudinal axis generally oriented in the direction of the flight path and the conventional position of the pilot is perpendicular to this axis. Therefore acceleration produced by increase or decrease in speed only acts transversely to the spine of the operator. This is the preferred direction in which to apply the force as the maximum resistance of the operator is achieved when the forces are applied perpendicularly to the spinal axis. However, centrifugal acceleration produced by changes of direction of the flight path is applied perpendicular to the craft's longitudinal axis, and thus in the axis of the operator's spine. The latter force thus acts in a direction in which the operator has the least resistance to tolerance. Accordingly another object of the invention is to provide a means for supporting a subject in a manner so that the spinal axis can assume varying positions perpendicular to the forces involved in change of direction of the craft.

It becomes necessary from time to time in flight for subjects to evacuate the craft particularly when such crafts are disabled. Further in case of subjects enclosed in experimental space flights, for example, it may be necessary to escape from the craft because its landing characteristics are not satisfactory for protection of the subject or for other reasons. The methods involved for disengagement from the craft or escape contribute their own acceleration stresses. Further immediately upon disengagement from the craft the subject is exposed to deceleration stresses due to the atmosphere (wind blast). Thus, considering a high speed craft, upon ejection: The path of ejection is transverse to the flight path, generally speaking, and immediately there is a deceleration with respect to the previous forward velocity involved. Thus the subject is rapidly subjected to two different forces acting in different directions. It is a further object of my invention to provide a means for protecting the subject from both of these forces.

Another object of the instant invention is to provide a means for positioning the subject with respect to both such stresses so that the loads involved are continuously applied transversely of the spinal axis.

Another object of the invention is to provide a unitary assemblage of structure which continuously supports a subject with his spinal axis transversely positioned with respect to all accelerating stresses that may be applied to the craft while in flight which also continues to so position the subject during ejection and which continues to so position the subject until he is retrieved or contacts the surface of the earth.

It is also an object of the invention to provide environment maintaining device in the structure for continuously supplying the subject with those environmental factors necessary for his existance both while in the craft and upon ejection and descent to the earth.

Another object of the invention is to provide a capsule for enclosing a pilot in a craft which is pivotal about an axis transverse the longitudinal axis of the craft.

A further object of the invention is to provide an anthropomorphic support for the subject which support is a part of the capsule wall and which will oscillate with the capsule about the axis of the latter.

Another object of the invention is to provide a support for a subject within a craft wherein the support is mounted in a capsule movable about an axis and wherein the center of gravity of the mass composed to the subject, equipment and capsule lies in a line extending radially from the center of rotation of the capsule and transverse the spinal axis of the subject. Preferably the center of gravity lies in the plane of symmetry transverse to the axis of rotation. Thus, the center of gravity of the total capsule is located such that within the plane of symmetry transverse the axis of rotation the line from the axis of rotation to the center of gravity of the capsule is perpendicular to the spine of the operator.

One other object of the invention is to provide a capsule for enclosing a pilot within a manned craft which is freely rotatable within the craft to position the pilot supinely (perpendicularly) with respect to G loads yet wherein the pilot may maintain control of the craft no matter what his relative position is with respect to the craft.

An additional object of the invention is to provide a capsule as set forth in the preceding object including means for ejecting the capsule as an integral unit from the vehicle.

A further object of the invention is to provide support means for animate objects in rocket or similar vehicles wherein the latter are supported transversely with respect to the stresses (G forces), due to change in direction or speed of the craft as well as rotational spin that may be involved.

It is also an object of the invention to provide methods for transversely orienting subjects with respect to acceleratory stresses wherein the supporting means effects the proper positioning of the subject under the influence of the acceleration involved. Accordingly G loads as they change will affect the repositioning of the support means and affect their own absorption transversely of a subject's spine.

Another object of the invention is to provide control means in manned aircraft operational by a pilot wherein the pilot is positioned as set forth in the preceding object and wherein the control means such as control stick pedals, throttle, etc., are constructed so as to be continuously oriented properly with respect to the pilot for his operation and control of the craft. Thus so as to be manipulated by the operator in supine position, during application of high G loads, and changes in position of the operator relative to the craft.

A further object of the invention is to provide support means as set forth heretofore which is positionable fixedly in relationship to the craft for entrance, for inspection, and adjustment, or other purposes, and also which can be positioned fixedly with respect to the craft by the operator, in a selected position, whenever high acceleration stresses are not expected. Such could be accomplished during takeoff, landing and as an emergency measure if malfunctioning of indirect vision displays occur, for example.

A further object of the invention is to provide life sustaining chambers in nose cones.

A further object of the invention is to provide an animal carrying anti-G capsules or support means for use in recoverable and non-recoverable nose cones.

A further object of the invention is to provide a support means as set forth in the preceding object wherein the capsule is ejectable from the nose cone.

Another object of the invention is to provide an anti-G swing for use in rocket propelled craft for supporting test animals which will provide positioning of the animal transversely to the accelerating forces.

Another object of the invention is to provide a capsule type life sustaining structure ejectable from nose cones and other craft including means for maintaining environmental conditions within the capsule wherein the latter are primarily positioned exterior of the capsule together with means for automatically disengaging the environmental elements and sealing the capsule.

A further object of the invention is to provide a capsule having energy absorbing and buoyant qualities suitable for landing on either land or water.

These and other objects and advantages will become apparent from the following description and the accompanying drawings wherein.

Figure 1:
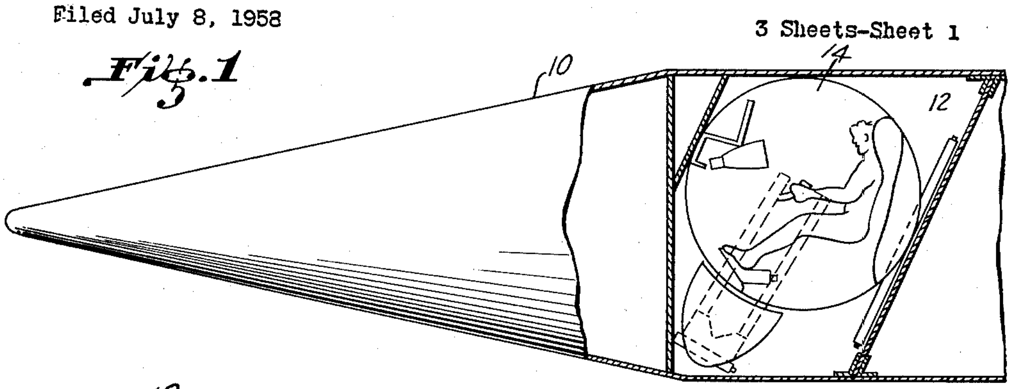
Figure 1 is a fragmentary plan view partly in section showing a subject positioning device (capsule) constructed in accordance with the invention within a space vehicle.

In Figure 1 there is illustrated a vehicle capable of high acceleration stresses: rapid changes in speed or direction. The craft is generally indicated by the reference character 10 and comprises a compartment 12. Within the compartment there is positioned a capsule 14. The capsule is more fully illustrated in Figure 7 and comprises a generally spherical enclosure preferably in the form of an oblate spheroid 16. The capsule is rotatably mounted on axle 18. The latter extends through the transverse central axis of the capsule. The capsule is provided with a window 22. An anthropomorphic seat 24 is secured to the inner side of the capsule. An entry door 26 is hingedly connected to the housing proper by hinge means 28 which is recessed within the housing. The door is adapted to be securely locked in closed position. Adequate atmospherically tight seal means are provided around the door edges.

The seat has an arm rest 30 adapted to support the arm of the operator. A control stick 32 is accessible at the hand of the operator in the normal resting position of the arm on the rest 30. To the front of the seat the various dial indicating means and other elements usable in determining the position and condition of the craft are placed. This can include a plan position indicator such as a TV screen or radar scope 34 adapted to acquaint the pilot continuously of the position of the craft in its path of flight relative to objects or approaching bodies, etc. The arm rest for the left hand is attached to the door as indicated at 36. The seat is positioned in the capsule such that the axis of the spine of the pilot will be positioned perpendicularly to the axis defined by the shafts 18.

A drag housing 40 is connected to the axle 18 on opposite sides of the capsule. The drag housing comprises a main housing portion 42 and arms 44 which are connected to the axle.

The main housing portion 42 clears the periphery of the capsule and the capsule is free to rotate about its shaft 38. The arms 44 comprise telescoping sections 46 which extend when the capsule is ejected as hereinafter described.

The vehicle wall or shell constructions 48 comprises guide rails 50 on opposite sides of the capsule. The guide rails can comprise channel members secured to the shell or formed as integral parts of the framing thereof. The shell structure includes a shelf or bottom support 52 alined with the channels 50. The shaft ends 54 seat on the shelf.

Plugs 56 bear against each of the shaft ends within the channels and fix the shafts in position against the shelves 52. The plugs are secured to the walls of the craft by explosive bolts 58. An ejection catapult means 60 is fixed to the craft structure and comprises an upper pad 62 which bears against the shaft adjacent the shelf 52.

Slip rings 64 and associated contacts are provided within the capsule. The slip rings lead to an electrical plug comprising male and female elements 66. The latter will separate on ejection. Ejection apparatus 60 is of the known type employed for ejection from aircraft.

It is to be noted that the pilot seat is anthropomorphically designed so as to conform to the body of the operator and it thus provides continuous support.

The capsule is designed so that the center of gravity of the combined load of the capsule and the pilot (subject) lies within the line extending radially from the axis of rotation, which latter line is perpendicular to the line extending between the subject's heart and head.

Drag housing 40 includes a parachute housing and contains therein a parachute 68. It will be readily understood that there are controls within the capsule for actuating the ejection apparatus including the ejection of the exterior covering or canopy of the craft. There are also controls for actuating the parachute. In addition there are timing devices which can be supplied for actuating the parachutes to prevent opening too soon and aneroid or Q sensing devices can be used. These features are well known in the art and are accordingly not described in detail.

Figure 4:
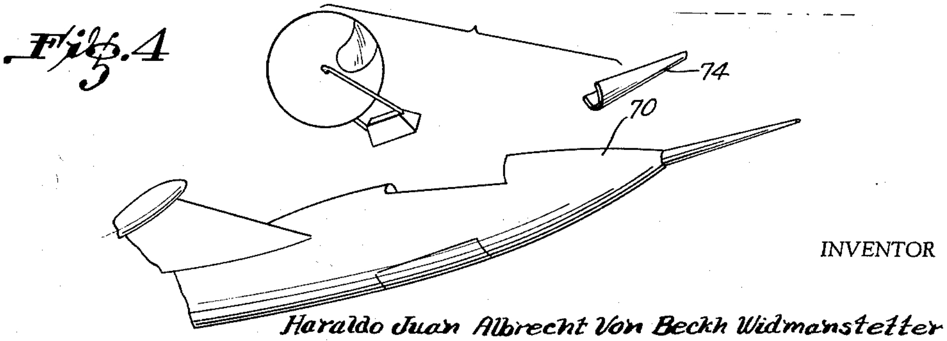
Figure 4 is a view showing the ejection of the capsule from an aircraft type vehicle in an upward direction.
Figures 5, 6, 7, 8, 9, 10, 11:
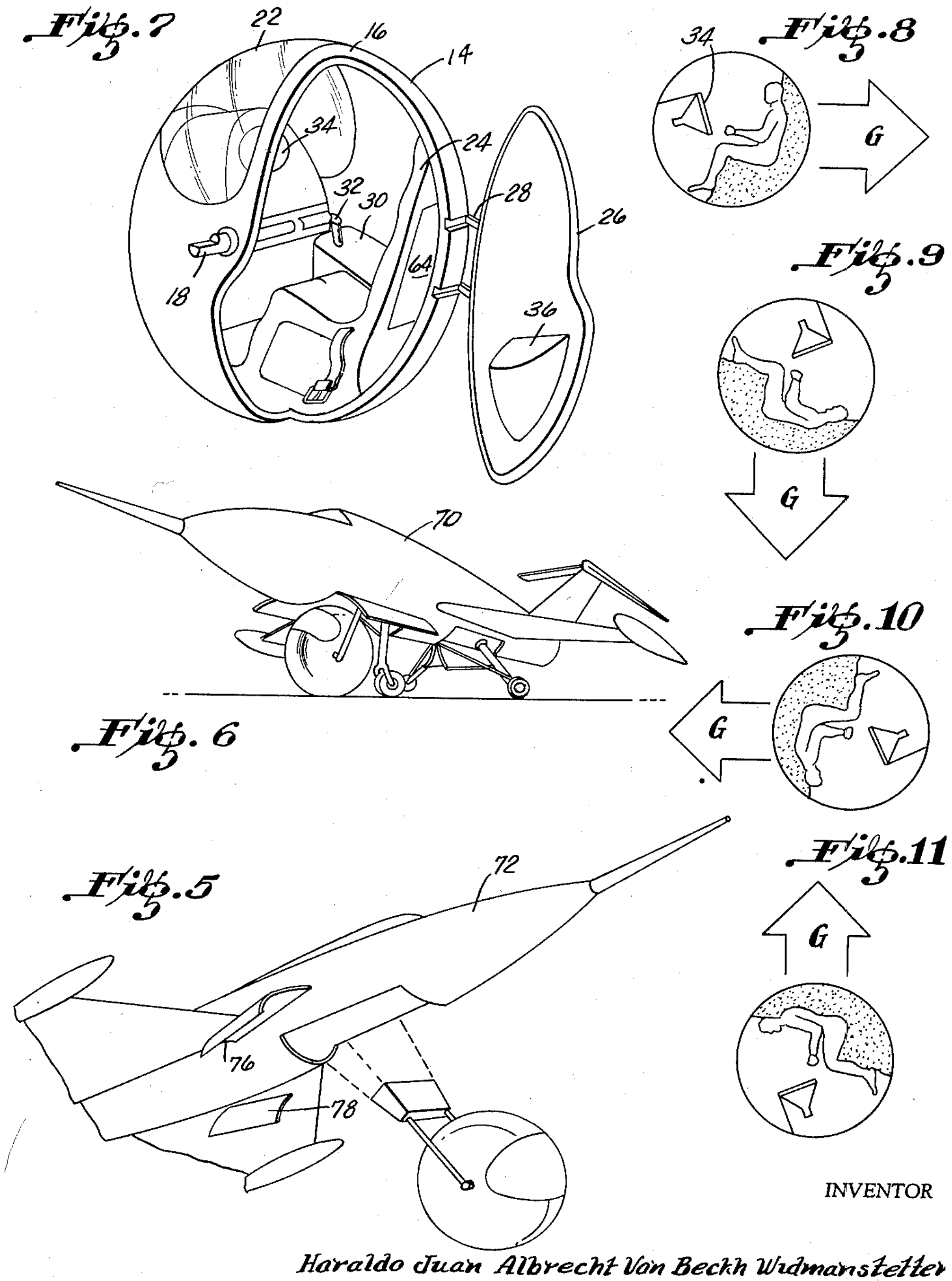
Figure 5 is a view similar to Figure 4 but showing a capsule ejected in a downward direction from the aircraft.
Figure 6 is a view illustrating the capsule in a position for crew entry and maintenance, and prior to emplacement in the aircraft.
Figure 7 is a perspective view of a capsule such as illustrated in Figures 5 and 6.
Figures 8, 9, 10 and 11 illustrate the automatic positioning of the subject in the supine position for absorption of the G forces transverse its spinal axis.

The drag housing not only constitutes a device for decelerating and stabilizing but, as illustrated in Figs. 4 and 5, the drag housing will function with the capsule so that the seat in the capsule may assume the proper transverse position for the operator to absorb the G forces transversely of the spine. The drag housing affects an automatic positioning of the subject after the ejection and upon entry into the atmosphere, where the atmospheric drag produces a serious deceleration effect upon the capsule.

Figures 4 and 5 illustrate a drag housing and associated capsule constructed in accordance with the invention being ejected from plane type vehicles 70 and 72, respectively. In the case of the vehicle 70, the direction of ejection is vertically upward. Figure 5 illustrates the capsule leaving from the bottom of the plane and the paired canopy plates 76 and 78 which are likewise ejected therewith.

The drag housing has a greater aero dynamic drag than the capsule and accordingly stays behind the capsule and acts as a brake on the forward movement of the capsule. The telescopic connections 46 will extend under the influence of the aero dynamic drag and this will increase the drag effect due to the placement of the housing farther away from the capsule (out of the lee of the capsule). The drag housing will prevent post ejection tumbling and will place the pilot transverse to the decelerating stress.

Figure 2:
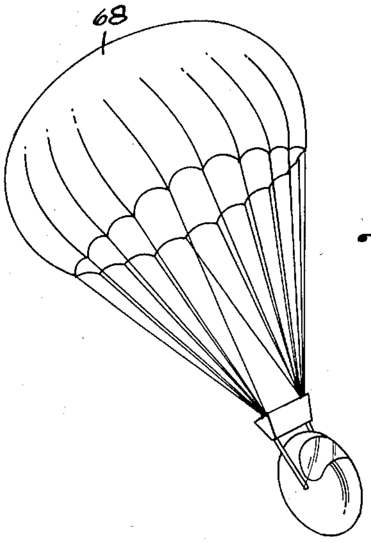
Figure 2 is a perspective view illustrating a capsule in free flight after ejection from the vehicle of Figure 1.

Figure 2 illustrates the parachute in use. This parachute will serve to automatically position the capsule. The capsule will swing about its axis as the shock load due to the deceleration caused by the parachute becomes effective.

When the parachute has been opened, the capsule will swing to place the subject once again in a supine position facing upwards. This will provide maximum protection during landing shock.

Figure 3:
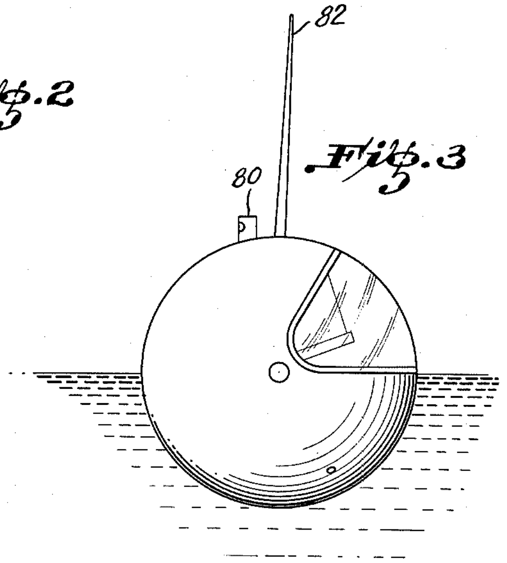
Figure 3 is a view illustrating the capsule afloat in water.

The hermetically sealed capsule is illustrated in Figure 3 as floating on water in the event that it does not come to earth or land. A telescopic air vent 80 can be provided. An antenna 82 is extendable from the capsule for the transmission and reception of radio signals. It is understood that auxiliary power means and emergency power equipment and means can be contained in the capsule for this purpose together with emergency food and environment maintaining devices.

Figures 8, 9, 10 and 11 illustrate the oscillations of the capsule about its rotational center as will occur under the influence of the G forces both while the capsule is in the craft and during and after ejection.

In Figure 8 the G forces are seen to act horizontally to the rear and the pilot is positioned with his spinal axis substantially perpendicular to the forces. Figures 9, 10 and 11 illustrate G forces acting vertically and forwardly and the resulting change in position of the pilot.

The capsule is provided with artificial horizon means 84 and other devices (displays). As previously described, these are constantly maintained in connection with the sensing and transmitting devices for continuously presenting a picture of the flight pattern of the vehicle, etc., to the operator, no matter what position the capsule assumes. These devices are well known in the art and accordingly no further disclosure with respect thereto is made herein.

Control handles such as stick 32 are likewise of an electrical type for transmission of control signals to the exterior of the capsule and into the body of the vehicle through the slip ring structure. It is apparent that through the use of servo mechanism devices any desired control functions can be achieved and also that electrical signals can be utilized for operation of indicating instruments, television devices and radar scopes within the capsule. Emergency auxiliary power supplies such as batteries are contained within the capsule. These are well known in the art and those skilled therein will have no difficulty in appreciating their adaptation and use.

Figure 12:
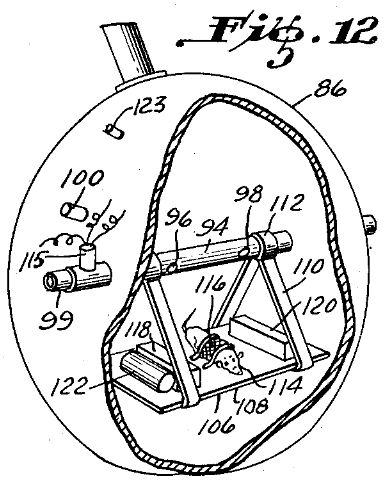
Figure 12 illustrates a capsule embodying a subject support adapted for use in the nose cone of a rocket.
Figure 13:
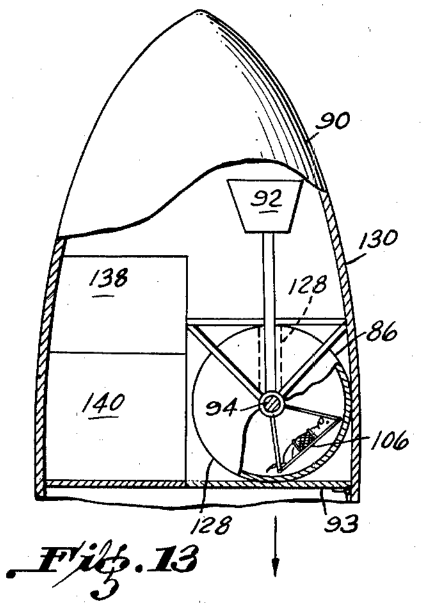
Figure 13 is a view showing the capsule of Figure 12 within a nose cone.
Figures 14, 15:
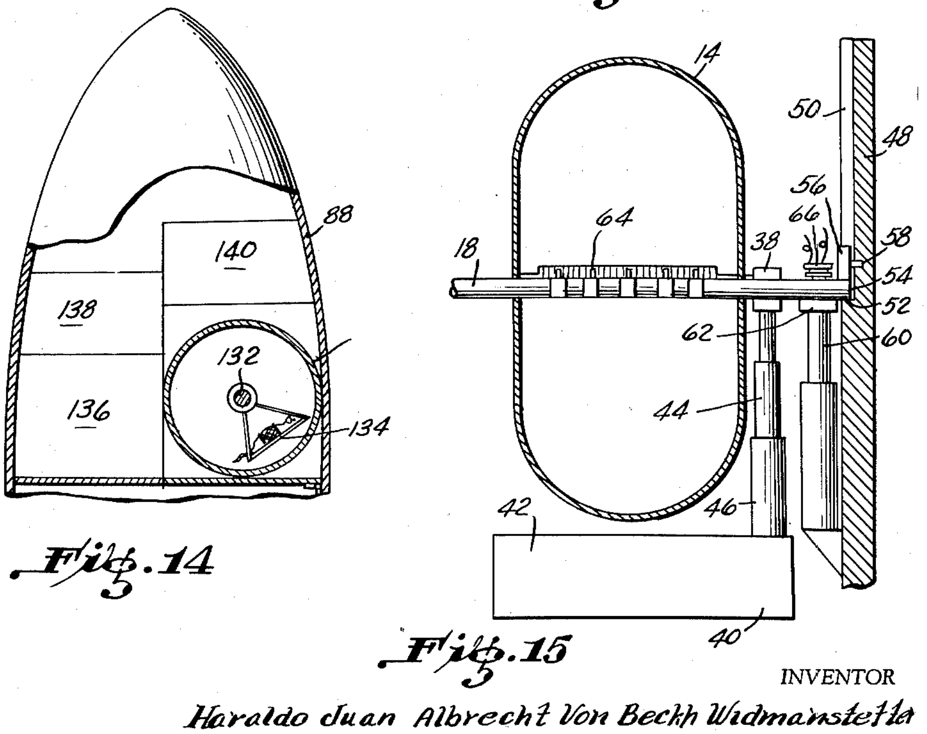
Figure 14 is an elevational view with some elements broken away illustrating a recoverable nose cone anti-G support.
Figure 15 is a fragmentary sectional view of a capsule as illustrated in Figures 1 through 11 showing its mounting within the air or space craft.

Figures 12 through 14 illustrate an embodiment of the invention for use in space flights where the subjects may be animals, such as mice, for example.

As illustrated in Figures 12, 13 and 14 the subject can be placed within a capsule 86 which is in many respects similar to that previously described and which has an access door for placement of the subject, inspection and adjustment of equipment, etc. In the apparatus of Figs. 12 and 13 the capsule is ejectable as in the previously described construction. In this instance the nose cone 90 has a compartment for the reception of the capsule, and its drag housing 92. An access door or hatch 93 is positioned in the bottom of the cone for insertion or removal and ejection of the capsule.

Apparatus of the type illustrated in Figs. 12 and 13 would be used wherein it was known that the nose cone would be unsuitable for landing of the occupant.

The drag housing can have parachute devices such as 68 of Fig. 2.

A shaft 94 extends transversely central of the housing. The shaft is hollow and receives conduits both electrical and tubular for connection to recording and transmitting equipment, and introduction of oxygen supply and other environment or control factors.

As illustrated the shaft can have openings 96, 98, for admission and withdrawal of air with conduit 99 being connected to the shaft for these purposes. However, it is not essential that connections be made through the shaft. Instead conduit (pipe) connections can be made through the sealed wall of the capsule as at 100. Electrical connections necessary to collect the intelligence desired from the subject, etc., however, must be made by means of slip rings and brushes or equivalent devices, as used in the apparatus of Fig. 15. Plug 115 is likewise of the same type as plug 66.

An anti-G swing 106 comprising a platform 108 and support rods 110 is provided within the capsule. The support rods are connected to journals 112. The latter are pivotally mounted on the shaft for free rotation of the swing through 360° about the shaft.

A mouse 114 is affixed in position on the swing with his spinal axis parallel to the platform 108 by means of a meshed restraining gauntlet 116. The latter can be formed of meshed fabric and holddown straps as illustrated.

To obtain a G-protection in all directions, the animal should be placed on the platform, as Fig. 12 shows, with its longer axis perpendicular to the capsule's shaft. However, if there is only a small space available for the capsule, the animal could be placed with its longer axis parallel to the capsule shaft. This would make it possible to use a smaller platform, and thus the capsule could also be much smaller. However, the G-protection would not be so complete, because in changes of direction of the flight path in direction of the capsule shaft, the animal would be exposed to accelerations, which act in its longitudinal axis.

Note that while in the position illustrated in Figure 12 that forces parallel the shaft are perpendicular to the spinal axis of the animal.

Food containers 118 and 120 for dry or liquid foods are positioned on the swing and adapted to supply food to the subject. An auxiliary oxygen bottle 122 is also provided. A pressure valve 123 is placed within the capsule wall, which avoids over-pressurization of the capsule after the activation of the oxygen bottle.

In this form of the invention the swing is rotatable within the capsule, while the capsule itself remains stationary with respect to the vehicle. The axis of the swing is transverse to the longitudinal axis of the vehicle and subtends an arc of the outer surface of the vehicle. As a result, assuming for example that the nose cone is spinning, the swing will accommodate and adjust the occupant to the resultant of the G-forces due to the spin or similar force as well as changes in direction or speed of the craft (velocity changes). The conduit connections at 99 and 100 can be of the type which are self sealing when the connection is cut prior to ejection.

The wings for supporting the animal subjects are constructed so that, as in the form of the invention illustrated in Figs. 1 and 7, the center of gravity of the combined load consisting of the swing and subject, lies in a line perpendicular to the axis of rotation and the latter line is perpendicular to the spinal axis of the subject intermediate the heart and head.

An ejection device 128 is provided in cone 90. The latter is of the same construction as the ejection device previously described with respect to the apparatus of Figure 15. The capsule is accordingly ejectable from the cone.

Figure 14 illustrates a form of the invention similar to that illustrated in Figs. 12 and 13 but here the capsule is not ejectable from the nose cone. Instead the nose cone is of the recoverable type. The shaft 132 and swing 134 are of the same construction as shaft 94 and swing 106, respectively. The parachute 136 is provided in the base of the cone itself.

Electronic recording and transmission equipment 138 and environmental control equipment 140 are provided in the nose cone.

It will be readily understood by those skilled in the art that the ejection of the capsule 86 and opening of the parachute in housing 92 or cone 88 can be controlled from the ground by radio or by automatic control means such as temperature and pressure sensitive devices.

While I have shown and described a preferred form of my invention, it will be understood that many changes in details and form can be made, and therefore I claim an exclusive right to all modifications and changes in form coming within the scope of the appended claims.

I claim:

1. In combination, in a high velocity craft, said craft having a longitudinal axis constituting the normal flight axis of said craft, a support for a living organism, said support being freely pivotal about an axis under the influence of G forces encountered during the flight of said craft, the last named axis being positioned laterally of said normal flight axis of said craft, said support having a surface facing said last named axis and having means adapted to position the major axis of the living organism in a direction extending transverse of the second mentioned axis and in fixed load supporting relationship with said support outwardly from said axis, said support being designed so that the center of gravity of the combined support and the organism supported thereon lies in a line extending radially from said last named axis and the latter line extends perpendicularly to the major axis of the living organism.

2. The combination set forth in claim 1 including a capsule, said support being mounted within said capsule, said capsule constituting a sealed chamber.

3. The combination of claim 2 including means in said craft for ejecting said capsule from said craft.

4. The combination of claim 2 including said capsule having shaft means, said support being rotatable on said shaft means, said shaft means being connected to said craft.

5. The combination of claim 4 including a drag housing connected to said capsule, said housing and said capsule being ejectable from said craft.

6. The apparatus of claim 5 including a decelerating means mounted in said drag housing and operable upon ejection of said capsule and housing from said craft.

References Cited in the file of this patent

UNITED STATES PATENTS

| | | |
|---|---|---|
| 1,902,428 | Verstegen | Mar. 21, 1933 |
| 2,497,153 | Cosakis | Feb. 14, 1950 |

FOREIGN PATENTS

| | | |
|---|---|---|
| 788,643 | Great Britain | Jan. 2, 1958 |

OTHER REFERENCES

Flight Magazine, June 27, 1952, volume LXI, issue No. 2266, pages 774 and 775.

9 10

UNITED STATES PATENT OFFICE

CERTIFICATE OF CORRECTION

Patent No. 2,985,413 May 23, 1961

Haraldo Juan Albrecht von Beckh Widmanstetter

It is hereby certified that error appears in the above numbered patent requiring correction and that the said Letters Patent should read as corrected below.

In the heading to the printed specification, line 4, for "1500 Cuba Ave., Alamogorodo, N. Mex." read -- Alamogordo, N. Mex. (Aeromedical Field Laboratory, Box 696, Holloman Air Force Base, N. Mex.) --.

Signed and sealed this 14th day of July 1964.

(SEAL)

Attest:

ESTON G. JOHNSON
Attesting Officer

EDWARD J. BRENNER
Commissioner of Patents

UNITED STATES PATENT OFFICE

CERTIFICATE OF CORRECTION

Patent No. 2,985,413 May 23, 1961

Haraldo Juan Albrecht von Beckh Widmanstetter

It is hereby certified that error appears in the above numbered patent requiring correction and that the said Letters Patent should read as corrected below.

In the heading to the printed specification, line 4, for "1500 Cuba Ave., Alamogorodo, N. Mex." read -- Alamogordo, N. Mex. (Aeromedical Field Laboratory, Box 696, Holloman Air Force Base, N. Mex.) --.

Signed and sealed this 14th day of July 1964.

(SEAL)

Attest:

ESTON G. JOHNSON
Attesting Officer

EDWARD J. BRENNER
Commissioner of Patents